Jan. 5, 1932. C. A. HOUSEMAN 1,840,099
PNEUMATIC CLUTCH
Filed Aug. 3, 1929 2 Sheets-Sheet 2
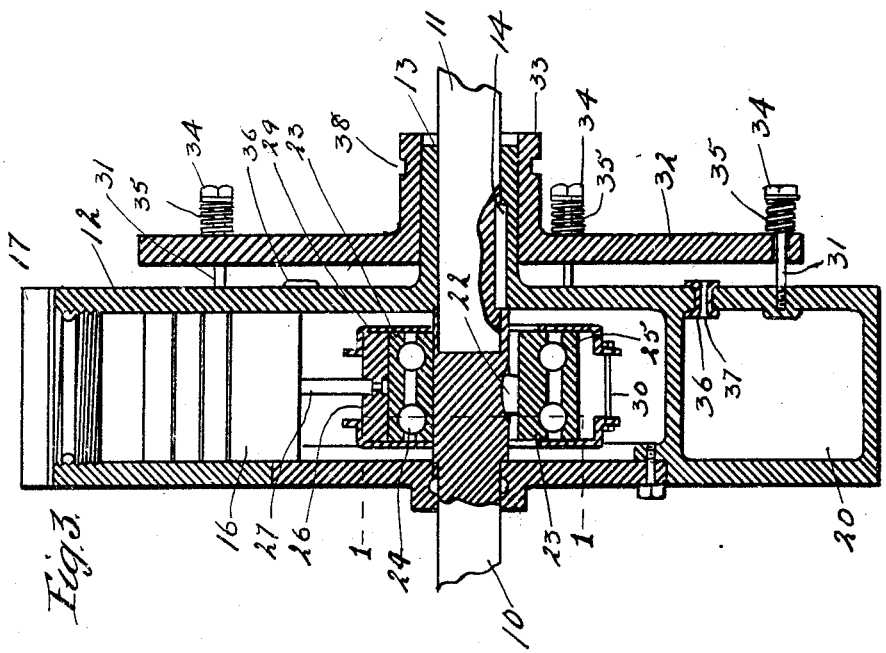
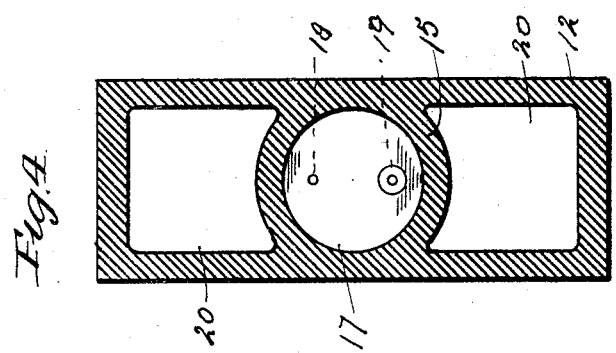
Inventor
Charles A. Houseman Patented Jan. 5, 1932

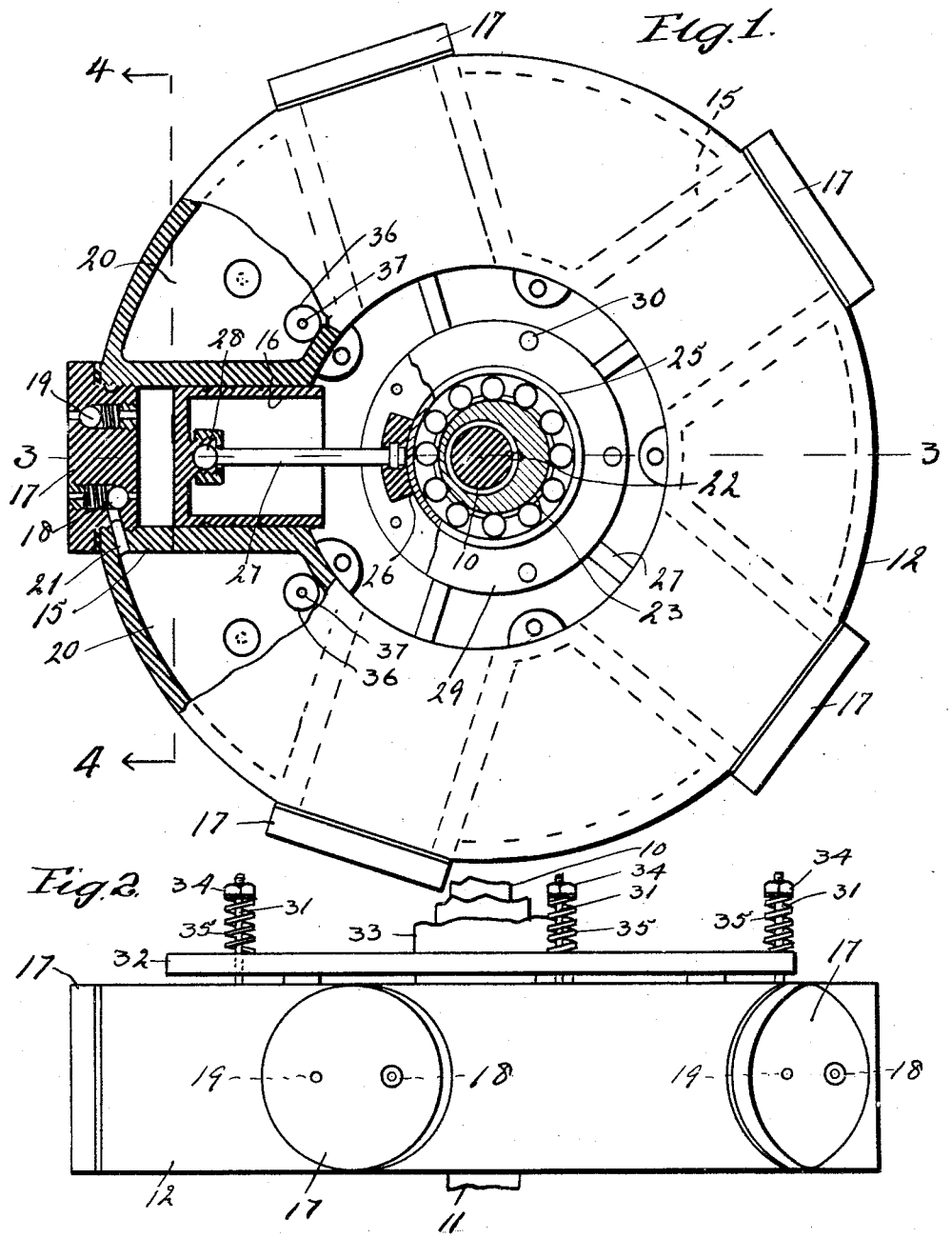

1,840,099

UNITED STATES PATENT OFFICE

CHARLES A. HOUSEMAN, OF PHILADELPHIA, PENNSYLVANIA

PNEUMATIC CLUTCH

Application filed August 3, 1929. Serial No. 383,316.

My invention relates to a new and useful pneumatic clutch for automobiles and the like and has for its object to provide a device of this description which will carry the load on air cushions.

A further object of the invention is to provide for gradually picking up the load by speed of the engine and a further object is to provide for freeing the driven shaft to drop the load by releasing the cushioning air.

With these and other ends in view, this invention consists in the details of construction and combination of elements hereinafter set forth and then specifically designated by the claim.

In order that those skilled in the art to which this invention appertains may understand how to make and use the same, I will describe its construction in detail, referring by numerals to the accompanying drawings forming a part of this application, in which:—

Fig. 1 is a face view of the clutch, the face plate being removed and the eccentric, and parts coacting therewith being sectioned on the line 1—1 of Fig. 3, also a portion of the casing being broken away to the interior of one of the compressing cylinders.

Fig. 2 is a plan view of Fig. 1.

Fig. 3 is a section on the line 3—3 of Fig. 1.

Fig. 4 is a section on the line 4—4 of Fig. 1.

While there are many designs in which the principle involved in my improved pneumatic clutch may be embodied, I have here shown a simple and effective construction of a clutch carrying out my invention and in this construction 10 represents the engine or driving shaft, 11 the transmission or driven shaft, and 12 represents the compressing casing, the latter having an extended hub 13 keyed upon the driven shaft as at 14 so as to revolve therewith and also revolvably mounted upon the driving shaft.

In the casing are formed a number of compressing cylinders 15 having the pistons 16 fitted to slide therein, each cylinder having its outer end closed with a head 17 in which are positioned the spring actuated valves 18 and 19 for the purpose hereinafter explained.

In the casing between the cylinders are formed spaces 20 which serve as air reservoirs and the valve 18 of each cylinder communicates with one of these spaces through the passageway 21 and the valve 19 leads from the atmosphere to the interior of the cylinder so that when the pistons are moved back and forth air will be drawn into the cylinders and delivered to the spaces 20 and compressed therein to the desired degree.

Upon the motor shaft is keyed as at 22 the eccentric 23 in the periphery of which are suitable race ways for the balls 24 and these balls are housed in by the eccentric strap or ring 25, thus providing a double ball bearing between the eccentric and the strap for the usual purpose.

26 represents shoes fitted to bear upon the ring 25, said shoes having the pitmen 27 attached thereto, the opposite ends of said pitmen being attached to the pistons in any suitable manner as at 28.

For convenience in holding the ring 25 and the shoes 26 in proper alignment with the eccentric, I introduce the split housing 29, the two halves of which are secured together by the bolts 30.

31 represents studs secured in one face of the casing and upon these studs is slidably mounted the release disc 32, said disc having a hub 33 which is slidably mounted upon the hub 13. Upon these studs are threaded the adjusting nuts 34 between which and the outer face of the release disc are interposed the springs 35, to normally force the disc toward the face of the casing.

In order that the compression spaces 20 may be vented when necessary, rubber plugs 36 are inserted in suitable holes through the face wall of the casing, these plugs having the vent holes 37 therethrough. These plugs are provided with flanged heads seated upon the outer face of the casing, and the release disc 32 is adapted to close against the outer surface of said heads, thereby closing the holes 37 to prevent the escape of air from the compression spaces 20.

The hub 33 of the release disc is provided with an annular groove 38 for the reception of the ends of a suitable fork carried by a clutch releasing foot treadle.

From the foregoing description, the operation of my improved clutch will be obviously as follows:—

The revolving of the motor shaft will actuate the pistons through the eccentric and the pitmen to bring about a compression of air in the spaces 20 and as this pressure arises, the pistons will be retarded or cause to exert a greater pressure upon the shoes until this pressure of the shoes upon the eccentric will over balance the load upon the transmission shaft when said transmission shaft will thereby be caused to revolve, and should the load be increased either suddenly or gradually, a further compression of the air will take place caused by the motor shaft revolving at a greater speed than the transmission shaft, and thus pick up the increased load, always carrying the load upon the air cushions in the cylinders and compression spaces, and it has been found in automobile practice, that while the engine is idling at high speed, the clutch may be brought into function and the machine gradually started as the air pressure in the spaces 20 gradually increases. It has also been found in such practice that an automobile equipped with my improved pneumatic clutch when being driven up a hill will gradually pick up the increased load and continue to run the machine with practically no slowing down thereof since by the engine speeding up, increased compression is had and consequently an increased resistance to the revolving of the motor shaft independent of the transmission shaft, as will be readily understood.

When it is desired to release the clutch or put it out of function, it is only necessary to draw the disc 32 away from the plugs 36, thereby releasing the air from the compression compartments through the openings 37 and removing the resistance to the revolving of the motor shaft independent of the transmission shaft, thus permitting the engine to idle.

As before stated, the principle involved in this pneumatic clutch may be embodied in various designs and therefore I do not wish to be limited to the exact details of construction as herein shown, as these may be varied within the limits of the appended claim without departing from the spirit of my invention.

Having thus fully described my invention, what I claim as new and useful is:—

In a device of the character described, a driving shaft, a driven shaft having its inner end journalled in the driving shaft, a chambered compression casing mounted upon said shafts, said casing being keyed to the driven shaft and free to revolve upon the driving shaft, an eccentric keyed to the driving shaft, an eccentric strap mounted upon ball bearings upon the eccentric, shoes contacting with the eccentric strap, a split housing enclosing the eccentric, eccentric strap and shoes, cylinders formed in the compression casing, pistons fitted to slide in said cylinders, pitmen connecting the pistons with said shoes, a disc slidably mounted upon a hub formed with the casing and attached to said casing by a series of bolts, springs for giving said disc a movement toward the said casing, vents formed in one wall of the casing communicating with the compression chambers of said casing, said vents being normally closed by said disc and means for moving the disc away from the casing to permit the escape of air from the compression chambers of said casing.

In testimony whereof, I have hereunto affixed my signature.

CHARLES A. HOUSEMAN.